United States Patent Office 3,377,303
Patented Apr. 9, 1968

3,377,303
POLYAMIDE COMPOSITION
Dwight E. Peerman and Leonard R. Vertnik, Minneapolis, Minn., assignors to General Mills, Inc., a corporation of Delaware
No Drawing. Filed May 3, 1966, Ser. No. 547,170
9 Claims. (Cl. 260—18)

ABSTRACT OF THE DISCLOSURE

There is disclosed a specific group of polymeric fat acid polyamides which possess properties suitable for hot melt bonding of vinyl based polymer substrates. These polymers are certain copolymers including a piperazine or dipiperidyl type diamine component. The piperazine type products include a copolymerizing acid and amine to provide suitable properties. With regard to the dipiperidyl type, in addition to compositions including a copolymerizing acid and amine, compositions are suitable with either a copolymerizing acid or amine with a polymeric fat acid, as well as compositions which include a dimer diamine and dicarboxylic acid other than a polymeric fat acid. Illustrative of one vinyl based polymer is polyvinyl chloride, i.e. "Pattina."

This invention relates to a polyamide or polycarbonamide composition formed by the condensation of a compound of the formula

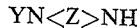

where Z is selected from the group consisting of

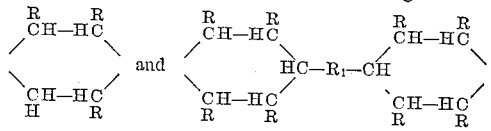

where R is selected from the group consisting of hydrogen and alkyl groups having from 1 to 6 carbon atoms and $R_1$ is a divalent aliphatic hydrocarbon group having at least one carbon atom, Y is selected from the group consisting of hydrogen, $R'NH_2$ and $R'OH$ where $R'$ is a divalent alkylene radical having from 1 to 6 carbon atoms, with other amide-forming compounds which includes at least one amide-forming derivative of a polymeric fat acid.

Polymeric fat acid polyamides are well known. Such polyamides possess adhesive properties. However, such polyamides provide little, if any, adhesion to vinyl based resins such as polyvinyl chloride. Illustrative of one such product is "Pattina," a vinyl based product resembling patent leather, employed as the upper material in shoes. Recently, polyvinyl resins such as polyvinyl chloride have become of importance as a synthetic "patent leather" and find use in products such as shoes, boots, purses, and products of the like which had formerly been made of leather. Difficulties are encountered in the manufacture of the products, such as shoes, in view of the poor adhesion of known adhesives to the polyvinyl based products.

It was discovered that if there is incorporated, as a reactant in forming a polyamide containing an amideforming derivative of a polymeric fat acid, the compound of the formula

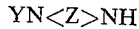

as hereinbefore defined, or mixtures of such compounds, unexpectedly good adhesion to vinyl based polymers results. In addition to possessing this unexpected adhesion to vinyl based polymers, the polyamides of this invention also adhere to other materials such as leather, pigskin suede, natural or synthetic rubber or rubber based soling materials, which thereby renders the polyamide of this invention particularly useful in the shoe, luggage and related industries. Good adhesion is also exhibited to materials such as wood, metals, glass, ceramics and the like, so that the products are also generally useful as an adhesive.

As indicated, one of the amide-forming reactants must be an amide-forming derivative of a polymeric fat acid. Such derivatives include the polymeric fat acids themselves, the anhydrides thereof, the halides (preferably the chloride), the alkyl or aryl esters thereof (desirably having from 1 to 8 carbons) and the diamines derived from the polymeric fat acids. As is apparent, the acids, esters, halides or anhydrides will function as a dicarboxylic amide-forming derivative. The diamine will function as an amine amide-forming derivative. Mixtures of the dicarboxylic and amine amide-forming derivatives may be employed. If esters are employed, the preferred are the alkyl esters having from 1 to 4 carbon atoms and the most preferred is the methyl ester. It is also desirable that the polymeric fat acid have a dimeric fat acid content greater than 65% by weight and preferably greater than 90 or 95% by weight.

It is required that one of the reactants be the compound of the formula

where Z is selected from the group consisting of

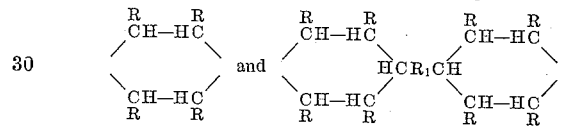

where Y, R, and $R_1$ are as previously defined. R is preferably hydrogen or methyl and preferably no more than two R groups in any one group

are methyl, the remaining R group being hydrogen. Where all R groups are hydrogen, the radical may be designated as $Z_1$. $R_1$ is a divalent aliphatic hydrocarbon radical having at least one carbon atom and is preferably an alkylene group containing from 2 to 8 carbon atoms. Where Y is hydrogen or $R'NH_2$, polyamides are formed. Where Y is $R'OH$, polyester-polyamide compositions are formed. $R'$ is preferably a divalent alkylene radical having 1 or 2 carbon atoms.

As is apparent from the formula above, this reactant is an amine functional reactant in the amide-forming reaction. Accordingly, if the amide-forming derivative of the polymeric fat acid employed is the diamine, it will be necessary to employ a difunctional dicarboxylic compound, other than a polymeric fat acid. Such compounds are difunctional dicarboxylic amide-forming derivatives having about from 2 to 20 carbon atoms and include the acids, esters, anhydrides or halide derivative of the acids. These dicarboxylic compounds may be aliphatic, cycloaliphatic or aromatic, preferably hydrocarbon, compounds. Preferably these are compounds of the formula

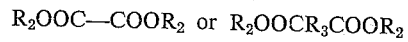

where $R_2$ is selected from the group consisting of hydrogen, alkyl, or aryl groups containing from 1 to 8 carbon atoms and $R_3$ is a divalent, hydrocarbon, aliphatic, cycloaliphatic or aromatic radical having from 1 to 20 carbon atoms. Further, the anhydrides or halides (preferably chlorides) of the acids may be employed. The preferred esters are the alkyl esters having from 1 to 4 carbon atoms, the most preferred being the methyl, ethyl, or acetate esters.

Preferably $R_3$ is a divalent aliphatic or aromatic hydrocarbon radical having from 6 to 12 carbon atoms. The straight chain, aliphatic hydrocarbon radicals are the most preferred. Illustrative of the dicarboxylic compounds are oxalic, malonic, adipic, succinic, suberic, sebacic, azelaic, pimelic, terephthalic, isophthalic, phthalic, naphthalene dicarboxylic acids and 1,4 or 1,3-cyclohexane dicarboxylic acid.

Particularly where the amide-forming derivatives of the polymeric fat acid is a dicarboxylic functioning derivative, other diamines may be employed as an amino reactant. Such diamines are aliphatic, cycloaliphatic, or aromatic diamines having from about 2 to 20 carbon atoms. Illustrative thereof are the alkylene diamines such as ethylene diamine, diaminopropane, diaminobutane, hexamethylene diamine, terethalyl diamine, isophthalyl diamine, cyclohexyl bis (methyl amine), and bis (amino ethyl) benzene. Ideally the preferred diamines may be represented by the formula

$$H_2NR_4NH_2$$

where $R_4$ is an aliphatic, cycloaliphatic or aromatic, hydrocarbon radical having from 2 to 20 carbon atoms. Representative of such diamines are ethylenediamine, 1,2 - diaminopropane, 1,3 - diaminopropane, 1,3 - diaminobutane, tetramethylene diamine, pentamethylene diamine, hexamethylene diamine, decamethylene diamine, octadecamethylene diamine, metaxylylene diamine, paraxylylene diamine, cyclohexylene diamine, bis (aminoethyl) benzene, cyclohexyl bis (methyl amine), diaminodicyclohexyl methane, and methylene dianiline. The most preferred diamines are those in which $R_4$ is an alkylene radical having from 2 to 6 carbon atoms.

Reference has been made to the amide-forming derivatives of polymeric fat acids. The polymeric fat acids and their amide-forming derivatives are well known.

A summary of the preparation of polymeric fat acids is found in U.S. Patent No. 3,157,681. Commercially available polymeric fat acids so prepared from tall oil fatty acids generally have a composition as follows:

| | Percent by wt. |
|---|---|
| $C_{18}$ monobasic acids (monomer) | 5–15 |
| $C_{36}$ dibasic acids (dimer) | 60–80 |
| $C_{54}$ and higher polybasic acids (trimer) | 10–35 |

The relative ratios of monomer, dimer, and trimer in such unfractionated polymeric fat acids are dependent on the nature of the starting material and the conditions of polymerization. For the purposes of this invention, the term "monomeric fat acids" refers to the unpolymerized monomeric acids, the term "dimeric fat acids" refers to the dimeric fat acids, and the term "trimeric fat acids" refers to the residual higher polymeric forms consisting primarily of trimer acids but containing some higher polymeric forms. The term "polymeric fat acids" as used herein is intended to be generic to polymerized acids obtained from "fat acids" and consists of a mixture of monomeric, dimeric, and trimeric fat acids. The term "fat acids" is intended to include saturated, ethylenically unsaturated and acetylenically unsaturated, naturally occuring and synthetic monocarboxylic aliphatic acids containing from 8 to 24 carbon atoms.

The saturated fat acids are generally polymerized by somewhat different techniques than those described in U.S. Patent No. 3,157,681, but because of the functional similarity of the polymerization products, they are considered equivalent to those prepared by the methods described as applicable to the ethylenically and acetylenically unsaturated fat acids. While saturated acids are difficult to polymerize, polymerization can be obtained at elevated temperatures with a peroxidic catalyst such as di - t - butyl peroxide. Because of the generally low yields of polymeric products, these materials are not currently commercially significant. Suitable saturated fat acids include branched and straight chain acids such as caprylic acid, pelargonic acid, capric acid, lauric acid, myristic acid, palmitic acid, isopalmitic, stearic acid, arachidic acid, behenic acid and lignoceric acid.

The ethylenically and acetylenically unsaturated fat acids which may be polymerized and their method of polymerization are described in the above-mentioned U.S. Patent No. 3,157,681.

Reference has been made hereinabove to the monomeric, dimeric and trimeric fat acids present in the polymeric fat acids. The amounts of monomeric fat acids, often referred to as monomer, dimeric fat acids, often referred to as dimer, and trimeric or higher polymeric fat acids, often referred to as trimer, present in polymeric fat acids may be determined by conventional gas-liquid chromatography of the corresponding methyl esters. Another method of determination is a micromolecular distillation analytical method. This method is that of R. F. Paschke et al., J. Am. Oil Chem. Soc., XXXI (No. 1), 5 (1954), wherein the distillation is carried out under high vacuum (below 5 microns) and the monomeric fraction is calculated from the weight of product distilling at 155° C., the dimeric fraction calculated from that distilling between 155° C. and 250° C., and the trimeric (or higher) fraction is calculated based on the residue. Unless otherwise indicated herein, this analytically method was that employed in the analysis of the polymeric fat acids employed in this invention. When the gas-liquid chromatography technique is employed, a portion intermediate between monomeric fat acids and dimeric fat acids is seen, and is termed herein merely as "intermediate," since the exact nature thereof is not fully known. For this reason, the dimeric fat acid value determined by this method is slightly lower than the value determined by the micromolecular distillation method. Generally, the monomeric fat acid content determined by the micromolecular distillation method will be somewhat higher than that of the chromatography method. Because of the difference of the two methods, there will be some variation in the values of the contents of various fat acid fractions. Unfortunately, there is no known simple direct mathematical relationship correlating the value of one technique with the other.

As earlier indicated, the polymeric fat acids employed to prepare the polyamides used in this invention have a dimeric fat acid content in excess of 65% by weight and preferably in excess of 90-95% by weight. Such polymeric fat acids are obtained by fractionation by suitable means such as high vacuum distillation or by solvent extraction techniques from polymeric fat acids having lower dimeric fat acid contents, such as the common commercially available products described earlier.

The amine amide-forming derivative of the polymeric fat acids, a dimeric fat diamine, sometimes referred to as "dimer diamine," "dimeric fat amine," or "polymeric fat acid diamine," are the diamines prepared by amination of dimeric fat acids. Reference is made thereto in U.S. Patent No. 3,010,782. As indicated therein, these are prepared by reaction polymeric fat acids with ammonia to produce the corresponding nitriles and subsequently hydrogenating the nitriles to the corresponding amines. Upon distillation, the dimeric fat diamine is provided which has essentially the same structure as a dimeric fat acid except that the carboxyl groups are replaced by —$CH_2NH_2$ groups. Further, this diamine is also described in Research and Development Products Bulletin, CDS 2–63 by General Mills, Inc., June 1, 1963, as "Dimer Diamine" illustrated by the formula $H_2N$—D—$NH_2$ where D is a 36-carbon hydrocarbon radical of a dimeric fat acid.

The polyamides are prepared by heating the reactants at temperatures in the range of 100 to 300° C. for from 3 to 10 hours, the last 1 to 2 hours being conducted under vacuum or reduced pressure (0.5-25 mm. Hg). A typical heating schedule would appear as follows:

Heating up to 250° C. over about 2 hours and maintaining the temperature at about 250° C. for 2–4 hours at atmospheric pressure followed by 2–4 hours under vacuum as described above at 250° C. In general, the reactants are preferably heated over 200° C. and maintained at from 200 to 300° C. (preferably 250 to 275° C.) for about 3–4 hours, the last 1 to 2 hours under vacuum. All of the polyamide resins employed herein were prepared in this general manner which comprises general known amidification conditions.

Essentially molar equivalent amounts of carboxyl groups (a ratio of carboxyl to amine groups of essentially 1:1) are employed in preparing the polyamide. This will provide a polyamide which is essentially balanced or neutral, i.e. one in which the acid number and amine number is essentially equal. A slight excess of amine or acid groups may be employed; however, the ratio of amine to carboxyl groups is preferably maintained between 0.9:1 to 1.1:1. Under such conditions both the acid numbers and amine number will desirably be less than 35 and preferably will be less than about 20. Desirably, the acid or amine number will not exceed the corresponding acid or amine number by more than 25 units and preferably will not exceed by more than about 15 units.

While the presence of any amount of the compound

YN<Z>NH will provide some improvement in adhesion to vinyl, it is preferred that this compound provide from about 20–90 equivalent percent of the total amine groups employed and more preferably from about 25 to 75 equivalent percent. Optimum adhesion to vinyl resins is achieved with the use of about 45 to 65 equivalent percent. It is preferred that the amide-forming derivative of the polymeric fat acid contribute about 40 to 85 equivalent percent of the amide-forming functional groups contributed by the polymeric fat acid derivative. With the dicarboxylic amide-forming derivatives of a polymeric fat acid, it is preferred that from 50 to 75 equivalent percent of the total carboxylic groups employed be provided by the polymeric fat acid derivative. The remaining carboxyl groups will then be supplied by another difunctional, dicarboxylic amide-forming derivative, to which reference has previouely been made hereinabove. This other derivative will then provide from 15 to 60 and preferably from about 25 to 50 equivalent percent of the total carboxyl groups employed. Where the amine amide-forming derivative of a polymeric fat acid is employed, it is preferred that this amine functioning derivative provide about 45–70 equivalent percent of the total amine groups employed. As discussed earlier hereinabove, if only the amine amide-forming derivative of a polymeric fat acid is employed, the carboxyl groups for polyamide formation will necessarily be supplied by a different difunctional dicarboxylic amide-forming derivative which necessarily will provide all or 100 equivalent percent of the carboxyl groups employed. Where mixtures of the dicarboxylic and amine amide-forming derivatives of the polymeric fat acid are employed, this other dicarboxylic amide-forming derivative will provide the remainder of the carboxyl groups, not supplied by the carboxylic amide-forming derivative of the polymeric fat acid. When a copolymerizing diamine is employed, in addition to the compound

YN<Z>NH with the carboxylic amide-forming derivatives of the polymeric fat acids, this copolymerizing diamine will contribute the remainder of the necessary amine groups not supplied by the compound

YN<Z>NH on the order preferably of 10 to 90 equivalent percent and more preferably about 25 to 75 equivalent percent of the total amine groups employed. Generally if the dimeric fat diamine is employed in combination with the compound

YN<Z>NH no other copolymerizing diamine is employed. If desired, however, such may be employed, preferably in an amount not more than 40 equivalent percent, and more preferably in an amount not more than 25 equivalent percent of the total amine groups employed. Where the polyester-polyamide composition is to be prepared, the ratio of the sum of the amine and hydroxyl groups to the carboxyl groups should essentially be 1:1 (preferably about 0.9:1 to 1.1:1).

The following examples will serve to best illustrate further the spirit and scope of the present invention. These examples are not to be construed as limiting, but merely serve as illustrations of the invention. Percentages and parts are by weight unless otherwise indicated. Also for convenience in illustration, the polymeric fat, or the amide-forming derivatives thereof, in the examples are polymerized tall oil fatty acids except where otherwise indicated.

Example I.—Preparation of polyamide

Polyamides were prepared by adding all reactive ingredients to a flask, heating under nitrogen with stirring over a two hour period to 225–250° C. This temperature was maintained with stirring over a two hour period under nitrogen and for an additional two hours under a vacuum of 25–30 in. Hg. The resins were then cooled rapidly and the resins recovered.

The polymeric fat acids employed were distilled polymerized tall oil fatty acids having the following analysis:

| | |
|---|---|
| Percent monomer (M)[1] | 0.7 |
| Percent intermediate (I)[1] | 2.3 |
| Percent dimer (D)[1] | 95.3 |
| Percent trimer (T)[1] | 1.7 |
| Acid value (A.V.) | 194.5 |
| Saponification value (S.V.) | 197.6 |
| Iodine value (I.V.) | 132.6 |

[1] Gas-liquid chromatography.

The reactants and amounts were as follows:

| | Reactant | Equivs. | Grams |
|---|---|---|---|
| 1 | Polymeric fat acids | 2.25 | 639.0 |
|  | Sebacic acid | 0.75 | 76.0 |
|  | Ethylene diamine | 1.56 | 47.0 |
|  | Piperazine | 1.50 | 65.0 |
| 2 | Polymeric fat acids | 2.25 | 639.0 |
|  | Sebacic acid | 0.75 | 76.0 |
|  | Ethylene diamine | 1.16 | 35.0 |
|  | Piperazine | 1.90 | 82.0 |
| 3 | Polymeric fat acids | 2.25 | 639.0 |
|  | Sebacic acid | 0.75 | 76.0 |
|  | Ethylene diamine | 0.96 | 29.0 |
|  | Piperazine | 2.10 | 90.0 |
| 4 | Polymeric fat acids | 2.25 | 639.0 |
|  | Sebacic acid | 0.75 | 76.0 |
|  | Ethylene diamine | 1.36 | 41.0 |
|  | Piperazine | 1.70 | 73.0 |
| 5 | Polymeric fat acids | 2.00 | 568.0 |
|  | Sebacic acid | 1.00 | 101.0 |
|  | Ethylene diamine | 1.80 | 54.0 |
|  | 1,3-di(4-piperidyl) propane | 1.20 | 126.0 |
| 6 | Polymeric fat acids | 2.00 | 568.0 |
|  | Sebacic acid | 1.00 | 101.0 |
|  | Ethylene diamine | 1.60 | 48.0 |
|  | 1,3-di(4-piperidyl) propane | 1.40 | 147.0 |
| 7 | Polymeric fat acids | 2.00 | 568.0 |
|  | Sebacic acid | 1.00 | 101.0 |
|  | Ethylene diamine | 1.40 | 42.0 |
|  | 1,3-di(4-piperidyl) propane | 1.60 | 168.0 |
| 8 | Polymeric fat acids | 2.00 | 568.0 |
|  | Sebacic acid | 1.00 | 101.0 |
|  | Ethylene diamine | 1.20 | 36.0 |
|  | 1,3-di(4-piperidyl) propane | 1.80 | 189.0 |
| 9 | Polymeric fat acids | 2.00 | 568.0 |
|  | Sebacic acid | 1.00 | 101.0 |
|  | Ethylene diamine | 2.00 | 60.0 |
|  | 1,3-di(4-piperidyl) propane | 1.09 | 115.0 |
| 10 | Polymeric fat acids | 1.66 | 471.0 |
|  | Sebacic acid | 0.84 | 85.0 |
|  | Ethylene diamine | 1.28 | 38.0 |
|  | 1,3-di(4-piperidyl) propane | 1.28 | 135.0 |
| 11 | Polymeric fat acids | 1.34 | 381.0 |
|  | Sebacic acid | 0.67 | 67.7 |
|  | 1,2-di-4-piperidyl ethane | 1.03 | 100.0 |
|  | Ethylene diamine | 1.03 | 30.9 |
| 12 | Polymeric fat acids | 1.138 | 323.2 |
|  | Sebacic acid | 0.569 | 57.5 |
|  | 1,4-di-4-piperidyl butane | 0.875 | 99.0 |
|  | Ethylene diamine | 0.875 | 26.2 |

| | Reactant | Equivs. | Grams |
|---|---|---|---|
| 13 | Polymeric fat acids | 1.50 | 426.0 |
| | Sebacic acid | 0.66 | 66.7 |
| | 2,5-dimethyl piperazine | 1.10 | 33.0 |
| | Ethylene diamine | 1.10 | 63.0 |
| 14 | Polymeric fat acids | 2.25 | 639.0 |
| | Sebacic acid | 0.75 | 76.0 |
| | Ethylene diamine | 1.53 | 45.9 |
| | Aminoethyl piperazine | 1.50 | 96.0 |

The following Table I illustrates the properties of the resin wherein the peel strength was determined on steel and the bond strength on Pattina to Standard Cement Liner designated as (P/SCL) in accordance with the Standard Cement Test Method for Elastomer Soles and Heels prescribed by the Rubber Manufacturer's Association, Inc. adopted May 20, 1960.

For purposes of comparison, polyamides were prepared from the same polymeric fat acids in the same manner but excluding the compounds $$YN\!<\!Z\!>\!NH$$

and employing other diamines in place thereof such as the diamine of dimeric fat acids (dimeric fat diamine), 1,4-bis(aminoethyl)benzene and 1,4-cyclohexyl bis(methylamine) wherein the ratio of equivalents of ethylene diamine to other amine was 3/1. The results are illustrated in the following Table II.

The foregoing clearly illustrates the significant advantage of the present products in bonding vinyl based materials (Pattina). The bond strength of other polyamides which do not include the compound $$YN\!<\!Z\!>\!NH$$

are significantly lower.

Example II

To illustrate the preparation of polyamides using various copolymerizing dicarboxylic acids and copolymerizing diamines, several polyamides were prepared from distilled polymeric fat acids of polymerized tall oil fatty acids having the following analysis:

| | |
|---|---|
| Percent M[1] | 2.3 |
| Percent I[1] | 2.8 |
| Percent D[1] | 91.4 |
| Percent T[1] | 3.4 |
| A.V. | 188.4 |
| S.V. | 198.75 |
| I.V. | 117.7 |

[1] Gas-liquid chromatography.

The resins were prepared by charging all ingredients to a reaction flask with the exception of the liquid diamines

TABLE I

| Poly-Amide | Acid No. | Amine No. | Ball and Ring Melting Point, °C. | Visc. (205° C.) | Tensile Strength (p.s.i.) | Percent Elongation | Peel Strength (steel), lbs./in. | Bond Strength (P/SCL), lbs./in. |
|---|---|---|---|---|---|---|---|---|
| (1) | 2.4 | 4.4 | 149 | 116 | 1,536 | 695 | 80 | 36.8 |
| (2) | 2.3 | 5.3 | 141 | 78 | 1,011 | 821 | 81 | 20.8 |
| (3) | 1.7 | 5.2 | 140 | 79 | 607 | 951 | 104 | 28.4 |
| (4) | 3.0 | 4.6 | 120 | 80 | 302 | 976 | 70 | 25.9 |
| (5) | 5.1 | 2.6 | 156 | 133 | 951 | 675 | 50 | 19.5 |
| (6) | 4.4 | 2.5 | 146 | 189 | 1,030 | 703 | 85 | 31.9 |
| (7) | 5.0 | 1.8 | 135 | 191 | 585 | 966 | 87 | 33.4 |
| (8) | 4.0 | 2.8 | 122 | 248 | 298 | 1,503 | 84 | 42.8 |
| (9) | 2.7 | 5.9 | 163 | 101 | 1,104 | 619 | 74 | 24.0 |
| (10) | 2.8 | 5.9 | 141 | 144 | 718 | 878 | 83 | 30.0 |
| (11) | 5.2 | 3.0 | 120 | 165 | 700 | 852 | 103 | 32.0 |
| (12) | 1.6 | 6.1 | 140 | 207.5 | 862 | 856 | 89 | 39.0 |
| (13) | 11.3 | 1.4 | 150 | 172.5 | 417 | 494 | 78 | 10.6 |
| (14) | 2.1 | 30.7 | 136 | 480 | 988 | 796 | 86 | 14.4 |

TABLE II

| Modifying Amine | Acid No. | Amine No. | Tensile Strength, p.s.i. | Elongation, percent | Peel Strength (steel), lbs./in. | Bond Strength (P/SCL), lbs./in. |
|---|---|---|---|---|---|---|
| Dimeric fat diamine (of polymerized tall oil fatty acids). | (a) 2.7<br>(b) 2.3 | 4.0<br>5.5 | 606<br>664 | 825<br>974 | 73<br>46 | 2.3<br>0.8 |
| 1,4-bis (aminoethyl) benzene | 6.2 | 1.3 | 1,193 | 520 | 3.2 | 0.5 |
| 1,4-cyclohexyl bis (methylamine) | 6.5 | 1.4 | 1,068 | 532 | 4.2 | 0.5 |

TABLE III

| Sample | Acids (Eq. percent) | | | | Amine (Eq. percent) | | | | | Equivalents Amine/Acid | Analysis | | | |
|---|---|---|---|---|---|---|---|---|---|---|---|---|---|---|
| | A | B | C | D | E | F | G | H | I | | Ball and Ring Melting Point°C. | Amine No. | Acid No. | Viscosity Poise at °C. |
| 1 | 77.5 | | 22.5 | | 62.5 | 37.5 | | | | 0.97 | 161 | 2.9 | 6.2 | 36 at 225° |
| 2 | 77.5 | | 22.5 | | 50 | 50 | | | | 0.97 | 146 | 0.8 | 5.1 | 175 at 225° |
| 3 | 77.5 | | 22.5 | | 90 | 10 | | | | 0.97 | 180 | 1.1 | 6.0 | 58 at 225° |
| 4 | 70 | | 30 | | 60 | 40 | | | | 0.97 | 137 | 0.8 | 4.7 | 280 at 225° |
| 5 | 80 | | 20 | | 67 | 33 | | | | 0.97 | 160 | 1.5 | 4.1 | 98 at 233° |
| 6 | 50 | 50 | | | 25 | 75 | | | | 0.95 | 116 | 1.3 | 10.9 | 41 at 250° |
| 7 | 50 | 50 | | | 40 | 60 | | | | 0.95 | 141 | 1.1 | 10.6 | 35 at 250° |
| 8 | 50 | 50 | | | 50 | 50 | | | | 0.95 | 163 | 1.1 | 11.8 | 25 at 250° |
| 9 | 50 | 50 | | | 60 | 40 | | | | 0.95 | 181 | 1.1 | 11.6 | 23 at 250° |
| 10 | 50 | 50 | | | 75 | 25 | | | | 0.95 | 204 | 1.0 | 12.0 | 18 at 250° |
| 11 | 50 | 50 | | | 90 | 10 | | | | 0.95 | 218 | 4.0 | 14.0 | 9 at 250° |
| 12 | 60 | 40 | | | 60 | 40 | | | | 0.95 | 166 | 0.8 | 11.0 | 20 at 250° |
| 13 | 67 | 33 | | | 67 | 33 | | | | 0.97 | 166 | 1.6 | 6.7 | 35 at 250° |
| 14 | 75 | | | 25 | 50 | 50 | | | | 0.95 | 153 | 1.3 | 11.7 | 19.5 at 250° |
| 15 | | 30 | | 20 | 40 | 60 | | | | 0.95 | 148 | 1.1 | 11.2 | 42.5 at 250° |
| 16 | 50 | 40 | | 10 | 40 | 60 | | | | 0.95 | 123 | 1.4 | 11.4 | 33 at 250° |
| 17 | 50 | 50 | | | | 60 | 40 | | | 0.95 | 144 | 0.4 | 9.3 | 131 at 250° |
| 18 | 50 | 50 | | | 20 | 60 | 20 | | | 0.95 | 107 | 0.8 | 9.8 | 65 at 250° |
| 19 | 50 | 50 | | | | 60 | | 40 | | 0.95 | 165 | 0.7 | 10.7 | 42 at 250° |
| 20 | 50 | 50 | | | 20 | 60 | | 20 | | 0.95 | 128 | 0.8 | 8.4 | 78 at 250° |
| 21 | 50 | 50 | | | | 75 | | 25 | | 0.95 | 130 | 0.4 | 11.4 | 68 at 250° |
| 22 | | | 100 | | | 50 | | | [1]50 | 1.00 | 134 | 1.3 | 3.3 | 0.652 inherent viscosity. |
| 23 | | 100 | | | | 50 | | | [2]50 | 0.95 | 130 | 1.2 | 15.3 | 258 at 250° |
| 24 | 100 | | | | 50 | 50 | | | | 0.97 | 86 | 2.3 | 5.4 | 18.5 at 250° |

[1] Equivalent weight 272.9.
[2] Equivalent weight 305.5.
A—Polymeric fat acids described hereinabove. B—Sebacic Acid. C—Adipic Acid. D—Terephthalic Acid. E—Ethylene Diamine. F—1,3-di-(4-piperidyl) propane. G—Diaminodicyclohexylmethane. H—Bis (aminoethyl) benzene. I—Dimeric fat diamine of polymerized tall oil fatty acids.

where used. The reactants were heated to about 70° C. at which time any liquid diamines were added. The heating continued over a two hour period to the reaction temperature of 250° C. and maintained for two hours at 250° C. under a nitrogen gas sweep, followed by an additional two hours at 250° C. under reduced pressure (15 mm. or less) before recovering the product. The reactants, amounts, and analysis can be seen from Table III, above, and the properties of the resulting products can be seen from Table IV.

TABLE IV

| Sample | Ultimate Tensile Strength, p.s.i. | Tensile Yield Strength, p.s.i. | Elongation, Percent | Peel Strength, lbs./in. |
|---|---|---|---|---|
| (1) | 344 | 344 | 735 | 58 |
| (2) | 237 | 213 | 1,620 | 62 |
| (3) | 2,230 | 1,240 | 520 | 9 |
| (4) | 158 | 158 | >2,500 | 92 |
| (5) | 992 | 471 | 765 | 70 |
| (6) | 74 | 74 | 1,710 | 64 |
| (7) | 333 | 333 | 740 | 91 |
| (8) | 834 | 382 | 610 | 72 |
| (9) | 1,254 | 669 | 468 | 31 |
| (10) | 2,115 | 1,240 | 410 | 6 |
| (11) | 2,098 | 1,990 | 160 | 4 |
| (12) | 913 | 578 | 576 | 65 |
| (13) | 1,207 | 623 | 579 | 32 |
| (14) | 160 | 160 | >1,600 | 77 |
| (15) | 480 | 85 | 730 | 87 |
| (16) | 290 | 200 | 850 | 117 |
| (17) | 2,750 | 210 | 324 | 45 |
| (18) | 162 | 60 | 890 | 58 |
| (19) | 1,020 | 390 | 580 | 59 |
| (20) | 208 | 106 | 1,290 | 71 |
| (21) | 350 | 77 | 1,440 | 69 |
| (22) | 1,230 | 150 | 740 | 147 |
| (23) | 129 | 38 | 850 | 81 |
| (24) | 120 | 120 | 420 | 62 |

Some of the foregoing resins were also tested for vinyl polymer (plasticized polyvinyl chloride) adhesion as described earlier hereinabove. The results thereon were as follows:

Sample: Bond strength, P/SCL lbs./in.
(1) _____ 20
(22) _____ 26.2
(24) _____ 9.2

As described hereinabove, it is apparent that vinyl based polymers can be bonded with the polyamide resins of this invention. The vinyl based polymers may be bonded to other substrates such as leather, metals, wood, paper, ceramics, natural or synthetic rubber or may also be bonded to itself. The bonding is accomplished by interposing the polyamide resin between the vinyl based substrate and either a second vinyl based substrate or a different substrate. The bonding is preferably accomplished by use of a conventional hot melt technique such as by application of the molten resin or extruded rod or resin with the application of heat. The resin may also be interposed in the form of a sheet or film, grindings or powder which upon application of heat followed by cooling provides the bonded article. Although high pressure is not required for the bonding operation, some pressure should be applied. It is generally unnecessary to exceed pressure of 100 p.s.i., if employed. The aforementioned test specification calls out 60 p.s.i. for bonding vinyl to soling materials. In addition to being employed as a cement or adhesive for vinyl based materials, the polyamides also find utility in the bonding of many other substrates. The polyamides, however, possess a special advantage in bonding of vinyl based polymers.

Example III

In this example, the polyester-polyamide composition is illustrated wherein the polyester-polyamide was prepared employing 1-(N-betahydroxyethyl-4-piperidyl)-3-(4-piperidyl) propane referred to below as Compound U. The reactants and amounts were as follows:

| | Equivalents | Grams |
|---|---|---|
| Polymerized tall oil fatty acids (same as in Example II) | 1.500 | 423.0 |
| Adipic acid | 0.434 | 31.7 |
| Ethylene diamine | 1.172 | 35.9 |
| Compound U | 0.704 | 89.3 |

The reactants were heated over a period of 1.5 hours to 225° C. and held at this temperature for 1.75 hours at atmospheric pressure and 2.25 hours under about 10 mm. Hg vacuum, followed by discharge and cooling.
The polymer properties were as follows:

Viscosity at 225° C. (poises) _____ 25
Hydroxyl value _____ 5.9
Amine No. _____ 34.7
Acid No. _____ 10.3
Tensile strength (p.s.i.) _____ 387
Percent elongation _____ 313
Peel strength (steel) (lbs./in.) _____ 65
Bond strength (P/SCL) (lbs./in.) _____ 18.1

The foregoing illustrates that the polyamide, including polyester groups, functions in the same manner in providing improved adhesion to vinyl based polymers.

Example IV

This example illustrates a composition prepared from a polymeric fat acid having a lower dimeric fat acid content. The polymeric fat acid (polymerized tall oil fatty acids) had the following analysis:

Acid number _____ 185.5
Saponification value _____ 197.4
Percent M _____ 9.4
Percent D _____ 68.9
Percent T _____ 17.3

The reactants and amounts were as follows and the procedure of Example II was employed.

| | Equivalents | Grams |
|---|---|---|
| Polymerized tall oil fatty acids | 1.66 | 471.0 |
| Sebacic acid | 0.84 | 84.4 |
| Ethylene diamine | 1.28 | 38.4 |
| 1,3-di-4-piperidyl propane | 1.28 | 135.0 |

The properties of the product were as follows:

Viscosity at 225° C. _____ 73.5
Ball and ring melting point ° C. _____ 145
Amine number _____ 6.4
Acid number _____ 3.4
Tensile strength p.s.i. _____ 457
Percent elongation _____ 716
Peel strength (steel) (lbs./in.) _____ 86
Bond strength (P/SCL) (lbs./in.) _____ 27.6

Example V

In this example, the product was prepared using a polymeric fat acid mixture having a lower dimer acid content, by the blending of two samples of polymerized tall oil fatty acids, one of which was the polymeric fat acid employed in Example IV; the other sample being one having a high trimeric fat acid content having the following analysis:

Saponification value _____ 196
Percent M _____ 2.3
Percent D _____ 34.1
Percent T _____ 62.2

The analysis of the resultant blend was as follows:

Eq. wt. _____ 284
Percent M _____ 9.2
Percent D _____ 67.9
Percent T _____ 18.6

The reactants and amounts were as follows:

| | Equivalents | Grams |
|---|---|---|
| Polymerized tall oil fatty acids of Example IV | 1.760 | 500.0 |
| Polymerized tall oil fatty acids of high trimeric fat acid content | 0.052 | 15.0 |
| Sebacic acid | 0.906 | 91.5 |
| Ethylene diamine | 1.386 | 41.6 |
| 1,3-di-4-piperidyl propane | 1.386 | 145.5 |

The reactants were heated over a 2 hour period to 250° C. and maintained at this temperature for 4 hours, the last two hours being under a 5–10 mm. Hg vacuum.

The properties of the product were as follows:

| | |
|---|---|
| Visc. at 250° C. (poises) | 190 |
| Ball and ring melting point ° C. | 149 |
| Amine number | 6.7 |
| Acid number | 3.4 |
| Tensile strength p.s.i. | 476 |
| Percent elongation | 804 |
| Peel strength (steel) (lbs./in.) | 40 |
| Bond strength (P/SCL) (lbs./in.) | 37 |

Other ingredients may be added which do not affect the basic composition including plasticizers, fillers, dyes, or pigments. While these may affect the properties to some extent, they do not materially change the properties of the basic polyamide resin material.

It is to be understood that the invention is not to be limited to the exact details of operation or the exact compounds shown and described, as obvious modifications and equivalents will be apparent to those skilled in the art and the invention is to be limited only by the scope of the appended claims.

The embodiments of the invention in which an exclusive property or privilege is claimed are defined as follows:

1. A polyamide composition consisting essentially of the amidification product, at temperatures of from 100 to 300° C., selected from the group consisting of (A)

(a) from 10–90 equivalent percent of a compound selected from the group consisting of piperazine, dimethyl piperazine, aminoethylpiperazine and mixtures thereof,
(b) from 10–90 equivalent percent of a diamine of the formula $H_2NR_4NH_2$ where $R_4$ is selected from the group consisting of aliphatic, cycloaliphatic and aromatic hydrocarbon radicals having from 2 to 20 carbon atoms,
(c) from 40–85 equivalent percent of a polymeric fat acid having a dimeric fat acid content greater than 65% by weight,
(d) from 15–60 equivalent percent of a dicarboxylic compound selected from the group consisting of $R_2OOC-COOR_2$ and $R_2OOCR_3COOR_2$ where $R_2$ is selected from the group consisting of hydrogen, alkyl and aryl groups containing from 1–8 carbon atoms and $R_3$ is a divalent, aliphatic, cycloaliphatic or aromatic hydrocarbon radical having from 1 to 20 carbon atoms;

(B)

(a) from 10–90 equivalent percent of a compound selected from the group consisting of 1,3-di-(4-piperidyl) propane, 1,2 - di - (4 - piperidyl) ethane, 1,4-di - (4 - piperidyl) butane, 1 - (N-β-hydroxyethyl-4-piperidyl) - 3 - (4-piperidyl) propane and mixtures thereof,
(b) from 10–90 equivalent percent of a diamine of the formula $H_2NR_4NH_2$ where $R_4$ is selected from the group consisting of aliphatic, cycloaliphatic and aromatic hydrocarbon radicals having from 2 to 20 carbon atoms,
(c) 100 equivalent percent of a polymeric fat acid having a dimeric fat acid content greater than 65% by weight;

(C)

(a) 100 equivalent percent of a compound selected from the group consisting of 1,3 - di - (4-piperidyl) propane, 1,2 - di - - (4-piperidyl) ethane 1,4 - di - (4-piperidyl) butane, 1-(N-β-hydroxyethyl-4-piperidyl)-3-(4-piperidyl) propane and mixtures thereof,
(b) 40–85 equivalent percent of a polymeric fat acid having a dimeric fat acid content greater than 65% by weight,
(c) 15–60 equivalent percent of a dicarboxylic compound selected from the group consisting of $R_2OOC-COOR_2$ and $R_2OOCR_3COOR_2$ where $R_2$ is selected from the group consisting of hydrogen, alkyl and aryl groups containing from 1–8 carbon atoms and $R_3$ is a divalent, aliphatic, cycloaliphatic or aromatic hydrocarbon radical having from 1 to 20 carbon atoms;

(D)

(a) 15–60 equivalent percent of a compound selected from the group consisting of 1,3 - di - (4-piperidyl) propane, 1,2 - di - (4 - piperidyl) ethane 1,4-di-(4-piperidyl) butane, 1 - (N-β-hydroxyethyl - 4 - piperidyl) - 3 - (4 - piperidyl) propane and mixtures thereof,
(b) 40–85 equivalent percent of the diamine of a polymeric fat acid, and
(c) 100 equivalent percent of a dicarboxylic compound selected from the group consisting of $$R_2OOC-COOR_2$$

and $R_2OOCR_3COOR_2$ where $R_2$ is selected from the group consisting of hydrogen, alkyl and aryl groups containing from 1–8 carbon atoms and $R_3$ is a divalent, aliphatic, cycloaliphatic, or aromatic hydrocarbon radical having from 1 to 20 carbon atoms; and (E)

(a) from 10–90 equivalent percent of a compound selected from the group consisting of 1,3 - di - (4-piperidyl) propane, 1,2 - di - (4 - piperidyl) ethane, 1,4 - di - (4 - piperidyl butane, 1-(N-β-hydroxyethyl-4-piperidyl) - 3 - (4-piperidyl) propane and mixtures thereof,
(b) from 10–90 equivalent percent of a diamine of the formula $H_2NR_4NH_2$ where $R_4$ is selected from the group consisting of aliphatic, cycloaliphatic and aromatic hydrocarbon radicals having from 2–20 carbon atoms,
(c) from 40–85 equivalent percent of a polymeric fat acid having a dimeric fat acid content greater than 65% by weight, and
(d) from 15–60 equivalent percent of a dicarboxylic compound selected from the group consisting of $R_2OOC-COOR_2$ and $R_2OOCR_3COOR_2$ where $R_2$ is selected from the group consisting of hydrogen, alkyl and aryl groups containing from 1–8 carbon atoms and $R_3$ is a divalent, aliphatic, cycloaliphatic or aromatic hydrocarbon radical having from 1 to 20 carbon atoms.

2. A polyamide as defined in claim 1 wherein polymerized tall oil fatty acids having ta dimeric fat acid content greater than 90% by weight are employed as said polymeric fat acid.

3. A polyamide as defined in claim 1 wherein product (A) consists essentially of 25–75 equivalent percent of piperazine, 25–75 equivalent percent of ethylene diamine, 50–75 equivalent percent of polymerized tall oil fatty acids having a dimeric fat acid content greater than 65% by weight and 25–50 equivalent percent of sebacic acid.

4. A polyamid as defined in claim 1 wherein product (B) consists essentially of 25–75 equivalent percent of 1,3-di-(4-piperidyl) propane, 25–75 equivalent percent of ethylene diamine, and 100 equivalent percent of polymerized tall oil fatty acids having a dimeric fat acid content greater than 65% by weight.

5. A polyamide as defined in claim 1 wherein product (C) consists essentially of 100 equivalent percent of 1,3-di-(4-piperidyl) propane, 50-75 equivalent percent of polymerized tall oil fatty acids having a dimeric fat acid content greater than 65% by weight and 25-50 equivalent percent of sebacic acid.

6. A polyamide as defined in claim 1 wherein product (C) consists essentially of 100 equivalent percent of 1,3-di - (4-piperidyl) propane, 50-75 equivalent percent of polymerized tall oil fatty acids having a dimeric fat acid content greater than 65% by weight and 25-50 equivalent percent of adipic acid.

7. A polyamide as defined in claim 1 wherein product (D) consists essentially of 30-55 equivalent percent of 1,3 - di - (4-piperidyl) propane, 45-70 equivalent percent of the diamine of polymerized tall oil fatty acids and 100 equivalent percent of sebacic acid.

8. A polyamide as defined in claim 1 wherein product (E) consists essentially of 25-75 equivalent percent of 1,3-di-(4-piperidyl) propane, 25-75 equivalent percent of ethylene diamine, 50-75 equivalent percent of polymerized tall oil fatty acids having a dimeric fat acid content greater than 65% by weight and 25-50 equivalent percent of sebacic acid.

9. A polyamide as defined in claim 1 wherein product (E) consists essentially of 25-75 equivalent percent of 1,3 - di - (4-piperidyl) propane, 25-75 equivalent percent of ethylene diamine, 50-75 equivalent percent of polymerized tall oil fatty acids having a dimeric fat acid content greater than 65% by weight and 25-50 equivalent percent of adipic acid.

References Cited
UNITED STATES PATENTS

| | | | |
|---|---|---|---|
| 3,242,141 | 3/1966 | Vertnik et al. | 260—78 |
| 3,231,545 | 1/1966 | Vertnik et al. | 260—78 |
| 3,167,554 | 1/1965 | Ernst. | |
| 2,879,547 | 3/1959 | Morris | 161—227 X |
| 2,450,940 | 12/1948 | Cowan et al. | 260—404.5 |
| 2,379,413 | 7/1945 | Bradley | 260—404.5 |

DONALD E. CZAJA, *Primary Examiner.*

C. W. IVY, *Assistant Examiner.*